(12) United States Patent
Nazarian et al.

(10) Patent No.: US 6,757,481 B1
(45) Date of Patent: Jun. 29, 2004

(54) DISK DRIVES AND DISK DRIVE-CONTAINING DEVICES HAVING SELECTIVELY CONTROLLABLE AND/OR ADAPTIVE QUIET AND HIGH PERFORMANCE MODES OF OPERATION

(75) Inventors: Ara W. Nazarian, Tustin, CA (US); Russell R. Stern, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/401,069

(22) Filed: Sep. 22, 1999

(51) Int. Cl.[7] .............................................. H04N 5/91
(52) U.S. Cl. .............................. 386/69; 386/68; 386/70
(58) Field of Search ...................... 386/6–8, 45, 68–70, 386/125–126; 360/78.07, 78.09, 97.02, 73.03; 369/44.28; 700/17, 278

(56) References Cited

U.S. PATENT DOCUMENTS

| | | | | |
|---|---|---|---|---|
| 4,967,382 A | * | 10/1990 | Hall | ............................ 700/278 |
| 5,235,482 A | * | 8/1993 | Schmitz | .................... 360/97.02 |
| 5,594,595 A | * | 1/1997 | Zhu | .......................... 360/73.03 |
| 5,901,009 A | * | 5/1999 | Sri-Jayantha et al. | .... 360/78.07 |
| 6,240,238 B1 | * | 5/2001 | Yada | ........................... 386/125 |
| 6,314,473 B1 | * | 11/2001 | Singer et al. | ............. 360/78.07 |

* cited by examiner

*Primary Examiner*—Thai Tran
*Assistant Examiner*—Christopher Onuaku
(74) *Attorney, Agent, or Firm*—Milad G. Shara, Esq.; Alan W. Young, Esq.

(57) ABSTRACT

A disk drive selectively provides either higher-performance seek operations or reduced-audible noise while effecting seek operations. A higher performance seek operating mode and a quiet seek operating mode are defined. The servo controller controls seek operations and may store and/or access a number of seek profiles including a first seek profile defined to provide relatively short average seek times and a second seek profile defined to provide quieter operation on average in comparison with the first seek profile. The servo controller and associated circuitry causes the drive to effect a seek operation subject to the first seek profile in response to the higher performance seek operating mode and effect a seek subject to the second seek profile in response to the quiet seek operating mode. The differing modes of operation may be invoked automatically, manually and/or adaptively, based upon a command from a host, input from a user, or some signal generated from within or without the drive or device incorporating the drive.

47 Claims, 6 Drawing Sheets

DISK DRIVES AND DISK DRIVE-CONTAINING DEVICES HAVING SELECTIVELY CONTROLLABLE AND/OR ADAPTIVE QUIET AND HIGH PERFORMANCE MODES OF OPERATION

BACKGROUND OF THE INVENTION

1. Field of the Invention

The present invention relates to disk drives and disk drive-containing devices having selectively controllable quiet and higher performance seek operating modes of operation. More particularly, the present invention relates to disk drives and disk drive-containing devices that are responsive to a command from a host device, adaptively responsive to a characteristic of received data and/or to other internal or external stimuli to assume either a high performance or a quiet mode of operation. In the high performance mode, seek operations may be carried out at high speed. In the quiet mode or modes of operation, seek operations may be carried out in such a manner as to generate comparatively less audible noise than seek operations carried out when the drive is operating in the high performance mode of operation.

2. Description of the Prior Art and Related Information

Disk drives able to carry out fast seek operations are widely considered to be better performing than drives able to carry out comparatively slower seek operations. Competitive forces, therefore, have conventionally steered the hard disk drive industry to develop drives exhibiting ever faster seek operations. It has been found, however, that high performance drives are acoustically noisier than comparatively less performing drives. In general, drives following faster profiles during seek operations are audibly noisier than drives following less aggressive seek profiles. A balance is usually sought between competitive performance (fast disk accesses) and acceptable levels of acoustical noise. In other words, hard disk drives designed for personal computers, workstations and servers are most often manufactured to operate at the highest sustainable performance level that does not produce objectionable noise levels. An example of this balancing approach may be found in U.S. Pat. No. 5,475,545 to Hampshire et al. In this document, Hampshire et al. describe methods to impose limits upon the control current applied to the actuator to reduce acoustic noise during seek operations.

The realm of applications in which hard disk drives are deployed, however, is growing. Increasingly, the high storage densities, low cost, modest power requirements and small size of current drives are having a synergistic effect upon the development and popularization of a wide variety of newly emergent digital consumer devices, such as digital cameras and digital video recorders, to name a few. In such devices, it has been found that the acoustic noise inherent in some high performance drives frequently is perceived as a lack of quality and workmanship, if not an outright annoyance. For such new devices to gain widespread acceptance, therefore, it is believed necessary for the drives integrated therein to exhibit significantly reduced noise levels. However, merely integrating conventional drives (wherein performance and acoustics are balanced) may not adequately address the fimdamental differences between computer-based applications and consumer devices and appliances. For example, there may be instances in which high speed seek operations are paramount to the proper functioning of the device. Conversely, there may also be instances in which the same device fuictions optimally following seek profiles defining slower seek operations.

Digital video recorder/players are illustrative of such a class of consumer digital devices that would benefit from a storage device having different modes of operations. Indeed, during playback or acquisition of a video data stream, the video recorder/player may best operate following aggressive seek profiles, thereby generating some (limited) level of acoustic noise. However, during times when the recorder/player is downloading information over a low bandwidth channel or in the middle of the night, it may be desirable, to avoid distracting or annoying the user, to perform comparatively slower seek operations to thereby operate in the quietest mode possible. Alternatively, while a moderate level of audible drive noise may be undetectable when the ambient noise levels are high, such a moderate level of audible drive noise may become objectionable when the ambient acoustic levels lower. Notwithstanding such special purpose applications, it is anticipated that these units will in some instances simultaneously serve as information processors, which at times will be demanding of hard disk performance. If hard disk drives are to be successfully integrated into everyday consumer devices such as digital video recorders and playback machines, cameras, musical instruments, kitchen appliances and the like, their existence and modes of operation must become uniformly unobtrusive, reliable, user-friendly and even adaptive.

SUMMARY OF THE INVENTION

An object of this invention, therefore, is to provide hard disk drives that selectively provide either higher-performance seek operations or reduced-audible noise while effecting a seek operation. It is another object of the present invention to provide disk drives that are optimally suited for incorporation into devices targeted for home and consumer uses.

Accordingly, this invention may be regarded as a disk drive that selectively provides either higher-performance seek operations or reduced-audible noise while effecting a seek operation, the disk drive. According to an embodiment thereof, the disk drive according to the present invention includes first means for defining a higher performance seek operating mode and second means for defining a quiet seek operating mode. Servo means control seek operations and include means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode.

According to further aspects of the present invention, the disk drive may include a host interface, the second means including a first host command received by the host interface. The quiet seek mode may be active for executing the first host command and the disk drive may revert to the higher performance seek mode after the first host command is completed. The disk drive may remain in the quiet seek mode after executing the first host command. The first means may comprise a second host command received by the host interface. The second means may comprise a disk drive control program. The second means may include detection means for detecting a characteristic of the data stream, either the quiet seek operating mode or the higher performance seek operating mode being invoked depending upon the detected characteristic. The second means may comprise detection means for detecting a data stream length, the quiet seek operating mode being invoked whenever the data stream length reaches a threshold length. The second means may comprise user accessible manual switch means for manually switching between the higher performance seek operating mode and the quiet seek operating mode. The second means may comprise means (such as a microphone) for measuring an ambient acoustic level, the measuring means invoking the quiet seek operating mode whenever the ambient acoustic level reaches a selectable threshold. A clock means may be provided, one or both of the first and second means being responsive to a signal from the clock means to selectively switch between the higher performance seek operating mode and the quiet seek operating mode depending upon a time of day.

The second means may define a plurality of mutually different quiet seek operating modes, each of the plurality of quiet seek operating modes causing the drive to operate with mutually different levels of audible noise. A host interface may be provided, and the second means may comprise a first host command received by the host interface, the first host command including an audible noise level parameter designating one of the plurality of quiet seek operating modes. The second means may comprise user accessible manual switch means configured to allow the user to manually cycle between the higher performance seek operating mode and each of the plurality of quiet seek operating modes. The second means may comprise means for measuring an ambient acoustic level and the measuring means may invoke a selected one of the plurality of quiet seek operating modes depending upon the measured ambient acoustic level. The disk drive may remain in the quiet seek mode for a selectable number of commands after executing the first host command. The disk drive media may be formatted into a first disk portion and a second disk portion, the first disk portion being formatted to designate the quiet seek operating mode for seek operations within the first disk portion and the second disk portion being formatted to designate the performance seek operating mode for seek operations within the second disk portion.

The present invention may also be viewed as a video recorder/player, comprising a video decoder for decoding a video stream input to the video recorder and playback device to provide a decoded video stream; an audio codec for decoding an audio data stream input to the video recorder and playback device to provide a decoded audio stream; an audio and video compressor for compressing the decoded video stream and the decoded audio stream and a disk drive coupled to the audio and video compression to store the compressed video stream and the decoded audio stream, the disk drive selectively providing either higher-performance seek operations or reduced-audible noise while effecting a seek operation, the disk drive. Such a disk drive may include first means for defining a higher performance seek operating mode; second means for defining a quiet seek operating mode and servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode. An audio and video decompression means may be coupled to the disk drive and to the codec means, the audio and video decompression means decompressing the stored video and audio stream and sending the decompressed audio stream to the codec means to encode the decompressed audio stream, and a video encoder means may be coupled to the audio and video decompression means, the video encoder means encoding the decompressed video stream according to a selected display format. A modem may be provided, the quiet seek mode being selectively active at least a portion of a time when the modem is downloading or uploading information.

The foregoing and other features of the invention are described in detail below and set forth in the appended claims.

DETAILED DESCRIPTION

Figure 1:
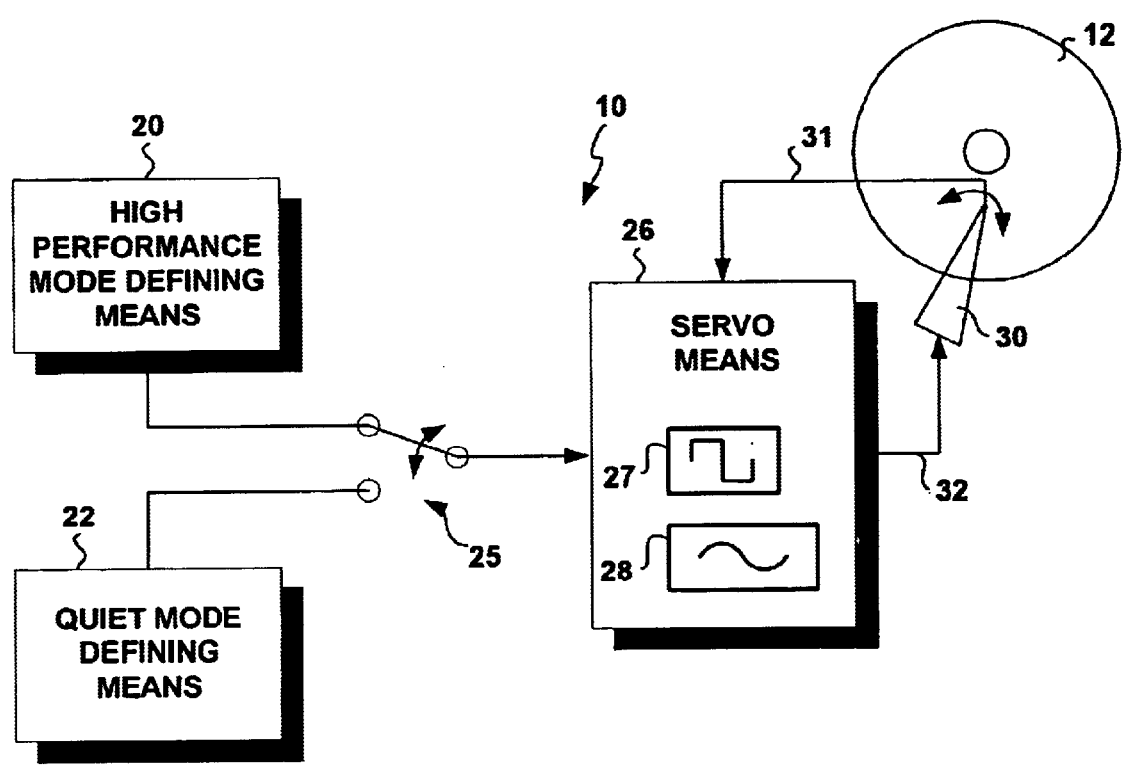
FIG. 1 is a block diagram of a disk drive according to the present invention.

FIG. 1 is a functional block diagram of a disk drive 10 that selectively provides either higher-performance seek operations or reduced-audible noise while effecting a seek operation, according to an embodiment of the present invention. As shown therein, the disk drive 10 includes first means 20 for defining a higher performance seek operating mode and second means 22 for defining a quiet seek operating mode. The disk drive 10 also includes servo means 26 for controlling seek operations. The servo means 26 includes means for defining a plurality of seek profiles, including a first seek profile 27 defined to provide relatively short average seek times and a second seek profile 28 defined to provide quieter operation on average in comparison with the first seek profile. The servo means 26 additionally includes means for effecting a seek 32 subject to the first seek profile 27 in response to the higher performance seek operating mode and for effecting a seek subject to the second seek profile 28 in response to the quiet seek operating mode. The seek effecting means 32 causes an actuator assembly 30 to sweep across a disk 12 to a target location thereon according to either of the first seek profile 27 or the second seek profile 28. A position signal 31 representative of the position of the read/write head of the actuator assembly 30 over the disk 12 is fed back to the servo means 26. The switching between the high performance seek operating mode and the quiet seek operating mode is functionally symbolized by the switch means 25. It is to be understood that the representation of the switch means 25 in FIG. 1 may denote a physical switch (manual or controlled), one or more logic commands or may be considered to be but a conceptual representation of the operation of switching between operating modes. The switch means 25 (that is, the switching between operating modes) is controlled by the high performance mode defining means 20 and/or the quiet mode defining means 22, the mode defining means 20, 22 being responsive to an internal or external stimuli to cause the switch means 25 to switch between the high performance seek operating mode and the quiet seek operating mode.

Figure 2:
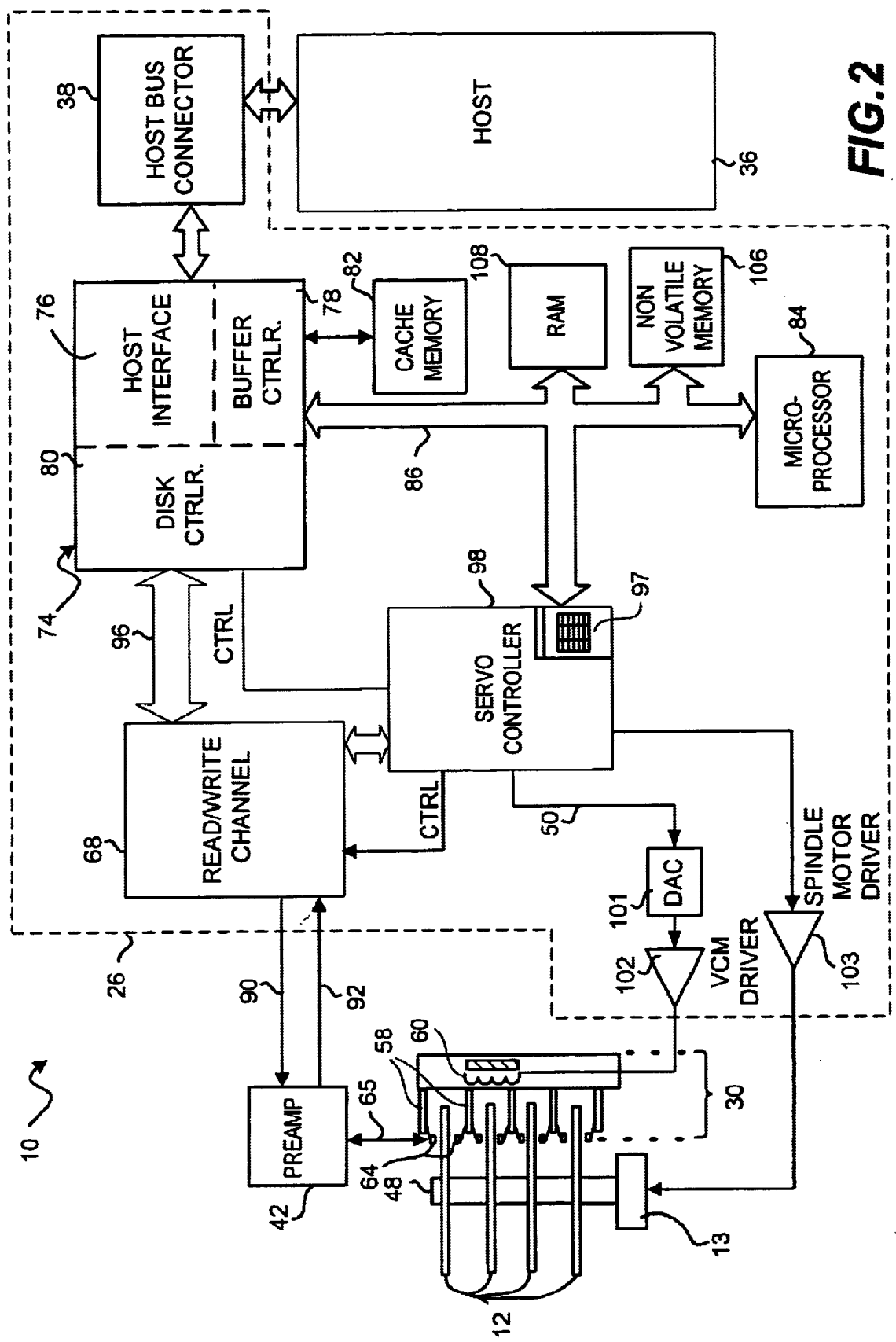
FIG. 2 is a block diagram illustrating an embodiment of a hard disk drive system, according to an embodiment of the present invention.

FIG. 2 is a functional block diagram of the major electrical components of the disk drive 10 of FIG. 1, according to an embodiment of the present invention. As shown in FIG. 2, disk drive 10 is connected to a host computer 36 via host bus connector 38 for the transfer of commands, status and data. One suitable standard for such connection is the EIDE standard presently favored for desktop personal computers, although the present invention is not dependent upon or limited thereto.

The disk drive 10 comprises one or more disks 12 for data storage, a spindle motor 13 for rapidly spinning each disk 12 (four shown in FIG. 2) on a spindle 48 and an actuator assembly 30 for swinging a plurality of heads 64 in unison over each disk 12. The heads 64 are connected to a preamplifier 42 via a cable assembly 65 for reading from and writing data to the disks 12. Preamplifier 42 is connected to a read/write channel 68 via read data line 92 and write data line 90.

The servo means 26 of FIG. 1 may comprise a read/write channel 68, servo controller 98, host interface and disk controller (HIDC) 74, digital to analog converter (DAC) 101, voice coil motor (VCM) driver 102, spindle motor driver (SMD) 103, interface processor 84, and several memory arrays, including servo controller internal memory 97, cache memory buffer 82, random access memory (RAM) 108, and non-volatile memory (ROM) 106.

Operations for reading and writing data in disk drive 10 initiated by the host 36 are executed under the control of a microprocessor 84 connected to the controllers and memory arrays via a bus 86. Program code executed by microprocessor 84 may be stored in the ROM 106 and/or the RAM 108. Program overlay code stored on reserved tracks of disks 12 may also be loaded into RAM 108, as required for execution. Suitably, the functionality of the microprocessor 84, the HDIC 74, the servo controller 98 and/or the host bus connector 38 may be integrated into a single disk processor unit. Servo controller 98 may suitably comprise an integrated microprocessor for executing servo control or may comprise servo code executed in microprocessor 84.

Data transferred by preamplifier 42 is encoded and decoded by read/write channel 68. During read operations, the channel 68 decodes data into digital bits that may be transferred on a non-return to zero (NRZ) bus 96 to HIDC 74. During write operations, the HIDC 74 provides digital data over the NRZ bus 96 to channel 68 that, in turn, encodes the data prior to its transmittal to preamplifier 42.

The HIDC 74 may comprise a disk controller 80 for formatting and providing error detection and correction of disk data, a host interface controller 76 for responding to commands from host 36, and a buffer controller 78 for storing data that is transferred between disks 12 and host 36. Collectively, the controllers in the HIDC 74 provide automated functions that assist the microprocessor 84 in controlling disk operations. A servo controller 98 provides an interface between the microprocessor. 84, the actuator assembly 30 and the spindle motor 13. Microprocessor 84 commands logic in servo controller 98 to position actuator assembly 30 using the VCM driver 102 via the DAC 101 and to precisely control the rotation of spindle motor 13 with a spindle motor driver 103.

The servo processor 98 may receive a command to position the actuator assembly 30 for accessing data at a specified desired track location or "target track" on disk 12. The current track position of the read/write transducer heads 64 of actuator assembly 30 may be stored in servo memory 97, such that the servo controller 98 may determine the required seek distance between the current track and target track on disk 12. Based on the seek distance, the servo controller 98 may retrieve a corresponding seek profile from the ROM 106 or the RAM 108, for example, and provide an output signal 50 corresponding to the retrieved seek profile to the VCM driver 102 via the DAC 101. In accordance with the present invention, a different seek profile may be retrieved, for a given seek distance, depending upon whether the quiet seek operation mode or the higher performance seek operating mode has been selected or invoked based upon some command and/or internal or external stimuli.

In a accordance with the digital output signal received from servo controller 98, the DAC 101 provides an analog output signal to the VCM driver 102 that is representative of the seek profile or seek profiles. The VCM driver 102 provides a current output to the coil 60 of the actuator assembly 30 for acceleration and/or deceleration of actuator arms 58 to perform a seek operation to move the read/write transducer heads 64 from the current track position to the target track position. As the actuator arms 58 move from the current track position to the target track position, position information may be received through the sensing of servo wedges disposed on the disks 12. Based on this position information, a position signal (shown at reference 31 in FIG. 1) may be provided through pre-amp 42 and servo read/write channel 68 to servo controller 98, wherein the position signal 65 is representative of the position of the read/write transducer heads 64 on the disks 12. Upon completion of a seek operation and alignment of the read/write transducer heads 64 at the desired target track, a read from the target track or write to the target track is performed.

The disk drive 10 according to the present invention selectively provides either a higher-performance operation or a reduced-audible noise operation while effecting a seek operation. According to the present invention, the higher performance seek operating mode and the quiet (reduced-audible noise) seek operating modes are active responsive to some internally or externally originating stimuli. In other words, the differing modes of operation are not set for the operating lifetime of the drive or device, but may vary during the course of normal use thereof.

The higher performance seek operating mode, according to an embodiment of the present invention, may include a mode wherein the seek operations are carried out aggressively, moving the actuator radially across the media as rapidly as the operating parameters allow. Alternatively, the higher performance seek operating mode may include a mode wherein the seek operations are carried out so as to balance performance with acoustic levels appropriate for the application envisaged for the drive or drive-containing device. The quiet seek operating mode, as the name implies, may include one or more modes of operation wherein some measure of access time is sacrificed in favor of a reduced-audible noise operation. A plurality of quiet seek operating modes may be defined, each exhibiting differing acoustic levels and/or seek performance. Such operating modes, whether higher performance or reduced-audible noise, according to the present invention, may be asynchronously and/or adaptively invoked responsive to some stimuli, such as a measured quantity, a detected event or characteristic and/or one or more commands from the host. The advent of such stimuli causes the drive 10 to switch between high performance and quiet seek operating modes.

Such higher performance seek operating mode(s) and quiet seek operating mode(s) may, according to the present invention, be defined in terms of position, velocity or acceleration profiles. Such profiles, in turn, may be stored in a memory (such as ROM 106, RAM 108 and/or servo memory 97) and accessed during the operation of the disk drive 10. In operation of disk drive 10, servo system operational programs may be stored in nonvolatile memory such as shown at 106 (e.g., ROM or flash memory) or disk drive reserve cylinders and loaded into RAM 108 for execution. In one exemplary embodiment of disk drive 10 in accordance with the present invention, separate profiles at least for the higher performance seek operating mode(s) and the quiet seek operating mode(s) for selected seek distances (across selected ranges of logical block addresses, for example) may be stored in the ROM 106 or within the servo memory 97. Upon start-up and during the normal course of operation of the disk drive 10, disk drive control programs, and the selected profile(s) corresponding to the higher performance operation mode(s) and/or the quiet seek operation mode(s) may be accessed by the servo controller 98 for positioning heads 64 for execution of a seek operation responsive to a read or write command in accordance with the accessed profile or profiles.

According to an embodiment of the present invention, the servo system operational programs and/or servo controller may include a first means 20 (such as logic, firmware or hardware) for defining at least one higher performance seek operating mode and a second means 22 (such as logic, firmware or hardware) for defining at least one quiet seek operating mode. The servo controller 98, according to an embodiment of the present invention, may include means, such as servo memory 97, ROM 106 and/or RAM 108 for defining a plurality of seek profiles. Such seek profiles include at least a first seek profile 27 (FIG. 1) defined to provide relatively short average seek times and a second seek profile 28 (FIG. 1) defined to provide quieter operation on average in comparison with the first seek profile 27. According to the present invention, when the higher performance seek operation mode is invoked, the servo controller 98 effectuates one or more seek operations subject to the first seek profile 27. In contrast, when the quiet seek operation mode is invoked, the servo controller 98 effectuates one or more seeks subject to the second profile 28.

The means 22 for defining the quiet seek operation mode, for example, may include a host command from the host 36 via the host interface, shown at 76 in FIG. 2. For example, the host command for setting the quiet seek operation mode or modes may include, for example, a set audio/visual mode "SET A/V" command, which command may or may not be followed by a number of parameters. The SET A/V command, according to an embodiment of the present invention, may invoke the quiet seek operation mode, wherein the drive exhibits reduced-audible noise characteristics while the drive is writing and/or reading audio/visual material, such as, for example, a Motion Picture Experts Group (MPEG) data stream. This may be done to minimize potentially bothersome noise from the drive while the user is viewing and/or storing movies, for example, on the hard disk drive 10 according to the present invention.

A plurality of mutually different quiet seek operating modes may also be defined, each of the plurality of quiet seek operating modes causing the drive 10 to operate with mutually different levels of audible noise. For example, the means for defining the quiet seek operating mode 22 may include a first host command received by the host 36. This first host command may include an audible noise level parameter designating one of the plurality of quiet seek operating modes. For purposes of illustration, the SET A/V command may include a selected audible noise level parameter ranging from 0 to n, where n is the number of available different quiet seek operating modes. According to an embodiment of the present invention, for example, a SET A/V 3 command issued from the host 36 may cause a seek profile corresponding to the "3" parameter (corresponding to a predetermined maximum noise level) to be accessed by the servo controller 98. The servo controller 98, in turn, may output a digital control signal corresponding to the accessed seek profile to the DAC 101. The DAC 101, in turn, generates a corresponding analog signal to the VCM driver 102, which provides the driving current to the coil 60 of the actuator assembly 30 in accordance with the accessed profile. The drive 10, in this manner, may be placed in the third of n possible quiet seek operating modes.

Alternatively, the drive 10 may be caused to toggle between seek operating modes, whether quiet or higher performance seek operating modes. For example, one or more manual switches (shown at reference numerals 25 in FIG. 1 and 442 in FIG. 4) may be provided to allow the user of the drive 10 or of the drive-containing device to toggle between the higher performance seek operating mode and the quiet seek operating mode or modes. Such a manual switch 442 may include a user-accessible push-button or toggle switch, for example, mounted on the drive 10 or on the drive-containing device. According to an embodiment of the present invention, the manual switch 442 may be configured to allow the user to manually cycle between the higher performance seek operating mode and each of the plurality of quiet seek operating modes. For example, starting form the higher performance seek operating mode, the user may depress the manual switch 442 once to cause the drive 10 to invoke and cause seek operations to be carried out according to a first quiet seek operating mode, depress the manual switch 442 again to invoke and cause seek operations to be carried out according to a second (even quieter, for example) quiet seek operating mode, and so on. Depressing the manual switch 442 further may cause the drive 10 to carry out seeks according to successively different quiet seek operating modes until the last such quiet seek operating mode, whereupon the drive 10 may revert back to the higher performance seek operating mode. Other schemes for manually invoking such seek operating modes may be envisaged by those of skill, and all such schemes should be deemed to fall within the scope of the present invention.

Figure 4:
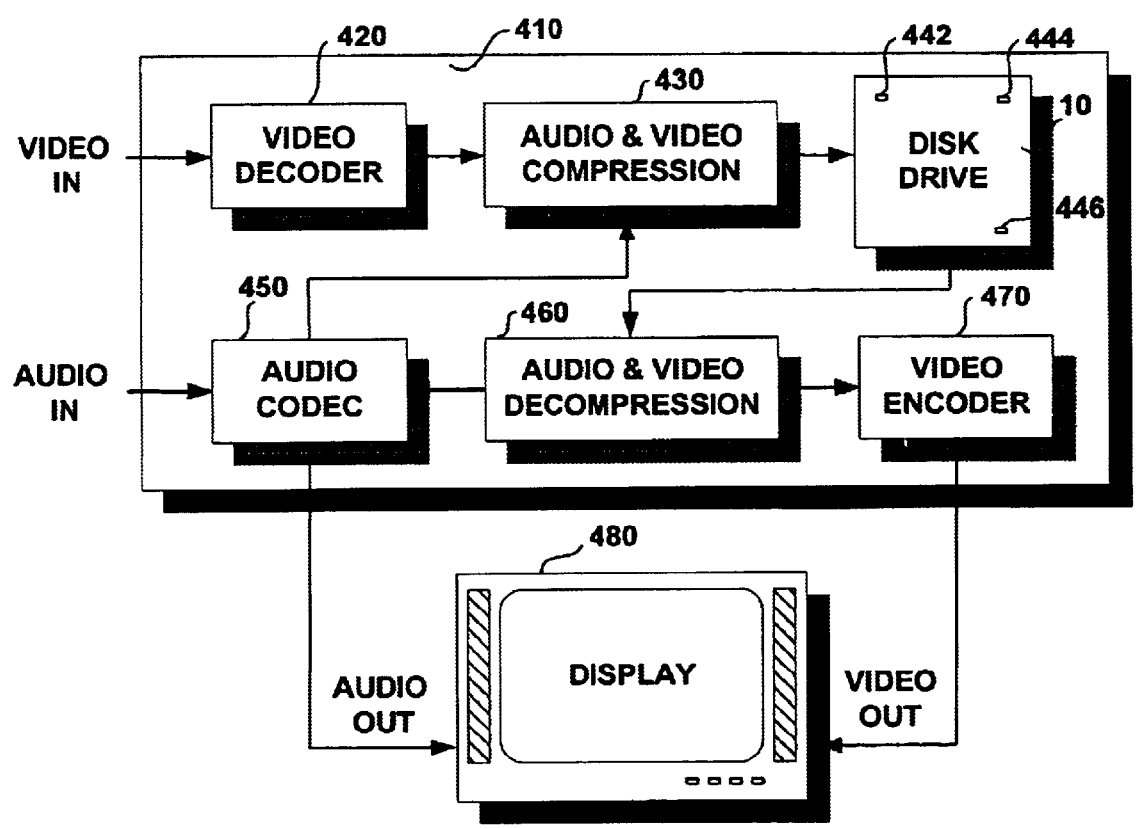
FIG. 4 is a block diagram of a video recorder and playback device incorporating a disk drive that selectively provides either higher-performance seek operations or reduced-audible noise while effecting a seek operation, according to another embodiment of the present invention.

The stimuli for invoking the quiet seek operating and the higher performance seek operating modes, therefore, may include commands and/or a manual selection using one or more push-buttons, toggle switches and the like. However, the present invention provides for other means of invoking the quiet seek and higher performance seek operating modes. For example, such stimuli may include a signal from a clock. Such a clock signal may be output from a clock mounted within or to the drive 10 (as shown at reference 444 in FIG. 4) or from a timing circuit within, for example, the microprocessor 84 or the servo controller 98. The first means 20 for defining the higher performance seek operating mode(s) and/or the second means 22 for defining the quiet seek operating mode(s) may be responsive to the clock signal to selectively switch between the higher performance seek operating mode and the quiet seek operating mode (or a selected one of the plurality of quiet seek operating modes) depending upon, for example, a time of day and/or the date. For example, the disk drive 10 according to the present invention may be incorporated in a random access digital video recorder/player, a block diagram of which is shown in FIG. 4. In such a case, television programming information may be periodically downloaded to the recorder/player via, for example, a telephone line connected to a modem coupled thereto. It is likely that such programming information may be transmitted to the recorder/player during periods of time when the telephone line is not likely to be in use, unless a dedicated telephone line is available. Often, therefore, such programming information may be transmitted in the middle of the night or during other low-usage periods. If the drive 10 were to be placed in the higher performance seek operating mode, it is possible that the aggressive seek profile or profiles 27 associated with the higher performance seek operating mode may disturb the sleep of the users of the video recorder/player 410. According to the present invention, a clock signal may be generated, causing the player 410 to carry out seek operation according to the or to one of the plurality quiet seek operating modes, thereby reducing the audible noise of the drive 10. A subsequent clock signal for example, may cause the drive 10 to carry out further seeks in the higher performance seek operating mode after a certain time of day. The generation of the clock signal according to the present invention, may be a programmable event, the timing thereof being selected by the user and input to the drive-containing device via a suitable user interface, such as a remote control device.

Alternatively still the first means 20 for defining the higher performance seek operating mode(s) and/or the second means 22 for defining at least one quiet seek operating mode(s) may be responsive to a signal generated from an ambient acoustic level measuring device 446 (shown at reference numeral 446 in FIG. 4), such as a microphone. The drive 10, for example, may be caused to carry out seek operation according to the or to one of the quiet seek operating modes whenever the ambient acoustic level falls below a predetermined or programmable (and/or user-defined) noise threshold. In this manner, when the ambient acoustic level falls below the noise threshold, the drive 10 will automatically carry out seeks according to the or to one of the quiet seek operating modes. The operation of the drive 10, therefore, will be quiet when the ambient noise levels are low and may carry out more aggressive (faster, more audible noise) seek operations when the ambient noise is above the threshold. Alternatively, a plurality of mutually different noise thresholds may be set, each causing a different one of the plurality of quiet seek operating modes to be selected, as the ambient noise levels rise and fall. Therefore, the operation of the drive 10 according to the present invention may be thought as adaptive, inasmuch as its modes of operation are responsive to changing ambient acoustic conditions.

The quiet seek operating mode(s) and the higher performance seek operating mode(s) may also be invoked based upon some detected characteristic of the incoming data stream. For example, the first means 20 for defining the higher performance seek operating mode(s) and/or the second means 22 for defining at least one quiet seek operating mode(s) may be responsive to a signal generated from a device that monitors the level of intensity of an audio track, for example. When the audio track (of a recorded and stored movie, for example) exhibits periods of relative quiet (during a romantic or suspenseful scene, for example), the drive 10 may be caused to invoke the or one of the quiet seek operating modes, if not already in such mode. The user of the device, in this manner, is less likely to be distracted from the movie by audible noise from seek operations form the drive 10. Alternatively still, the first means 20 for defining the higher performance seek operating mode(s) and/or the second means 22 for defining at least one quiet seek operating mode(s) may be responsive to some predetermined information in the data stream, such as header information, for example, that is read from the incoming data stream by the host 36 to identify the nature of the data stream. Downloaded TV programming data, for example, may include a header or other identifying characteristic that would alert the host 36 to place the drive 10 in the or one of the quiet seek operating modes. The quiet seek operating mode(s) may also be invoked, for example, at least a portion of a time when a modem or other communication device is active. According to a further embodiment of the present invention, the quiet seek operating mode or modes may be invoked whenever the data stream to be stored or read from the disk drive 10 reaches a threshold length. MPEG data streams, for example, are often of long length and may occupy, when stored on the disk drive 10, a substantial range of logical block addresses on the disks 12. When such long length read or write commands are detected, it may be appropriate to invoke the or one of the quiet seek operating modes, to avoid having long periods of time where the disk drive 10 is emitting a noticeable noise.

The disk drive 10 according to the present invention may be incorporated in any number of computer-based devices, consumer devices and/or hybrids thereof For example, the drive 10 may be incorporated in a set-top appliance that may integrate, for example, computing, Internet access and browsing capabilities, as well as cable television decoding functions, for example. When the set-top device is used as a computer or as a so-called network appliance, higher disk drive performance (characterized by more aggressive, faster seek operations) may be of greater perceived value to the user than lowered acoustics. Conversely, when the same set-top device is used as a cable TV decoder and/or as a television recorder-player device, a quieter mode of operation (characterized by less aggressive, somewhat slower disk seek operations) may be paramount. Toward that end, any of the methods and/or devices disclosed herein for automatically, manually or adaptively switching between seek operating modes may be implemented.

Alternatively, all or selected ones of the disks 12 may be physically and/or logically segmented and formatted into a first disk portion and a second disk portion. The first disk portion may be configured (in a boot sector, for example) to designate the quiet seek operating mode for seek operations within its boundaries and the second disk portion may be configured (in a boot sector, for example) to designate the high performance seek operating mode or modes for seek operations within its boundaries. In this manner, the disk may be segmented according to the intended usage patterns thereof to achieve the greatest performance, functionality, ease of use and transparency to the user.

Many other methods of causing the drive 10 to switch between seek operating modes may be implemented. For example, the quiet seek operating mode(s) may be active for executing a first host command from the host 36 via the host interface 76 and may revert to the higher performance seek operating mode after the first host command is completed. According to another embodiment of the present invention, the disk drive 10 may remain in the quiet seek operating mode after executing the first host command indefinitely, or for a selected period of time or number of subsequent host commands.

Figure 3A:
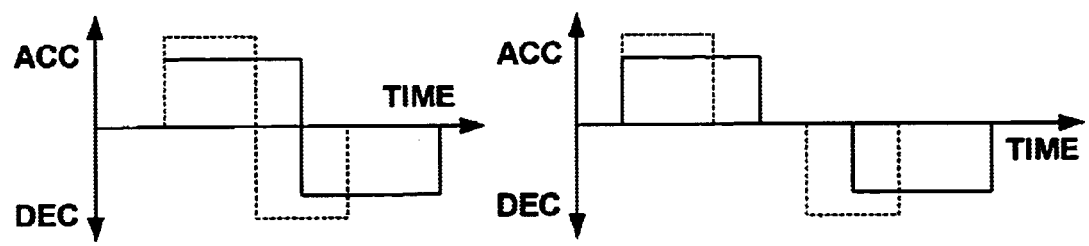
FIG. 3A shows graphs illustrating acceleration seek profiles suitable for implementing a quiet seek operating mode, according to an embodiment of the present invention.
Figure 3B:
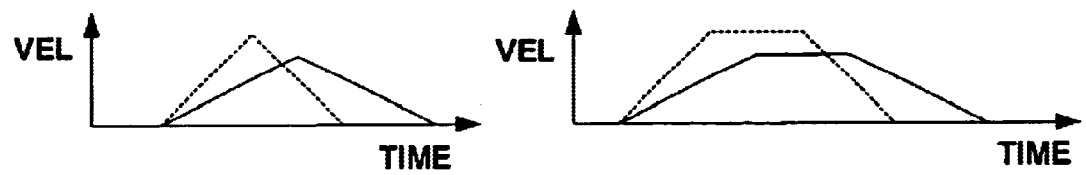
FIG. 3B shows graphs illustrating velocity seek profiles corresponding to the acceleration seek profiles of FIG. 3A.

The quiet seek operating mode or modes and the higher performance seek operating mode or modes, according to the present invention, are characterized by seek operations subject to differing seek profiles. FIGS. 3A through 3F show a number of graphs illustrating representative example of seek profiles and techniques suitable for implementing the quiet seek operating mode or modes. A combination of the techniques illustrated in FIGS. 3A through 3F may also be implemented as may other techniques that are not illustrated herein, but that may become apparent to those of skill in this art. FIG. 3A shows graphs illustrating acceleration seek profiles suitable for implementing a quiet seek operating mode, according to an embodiment of the present invention, whereas FIG. 3B shows graphs illustrating velocity seek profiles corresponding to the acceleration seek profiles of FIG. 3A. The left hand side graphs of FIG. 3A through 3F represent acceleration and velocity seek profiles that do not incorporate a coast component, during which the actuator is not driven, whereas the right hand side graphs of FIGS. 3A through 3F represent acceleration and velocity seek profiles incorporating such a coast component. The waveforms in dashed lines in FIGS. 3A through 3F represent a representative seek profile corresponding to the higher performance seek operating mode. These waveforms are shown in each of the graphs of FIGS. 3A through 3F for reference and comparison purposes only.

Figure 3C:
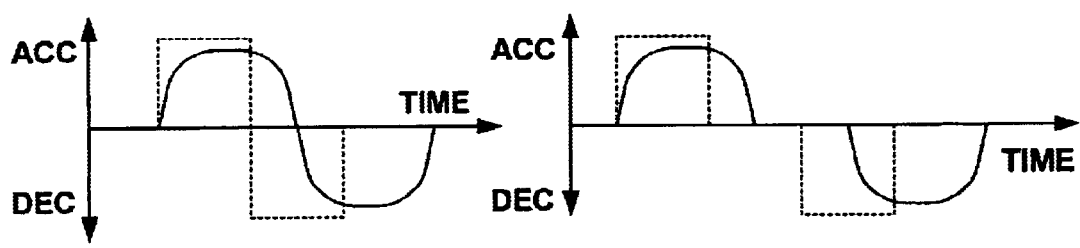
FIG. 3C shows graphs illustrating acceleration seek profiles suitable for implementing a quiet seek operating mode, according to a further embodiment of the present invention.
Figure 3D:
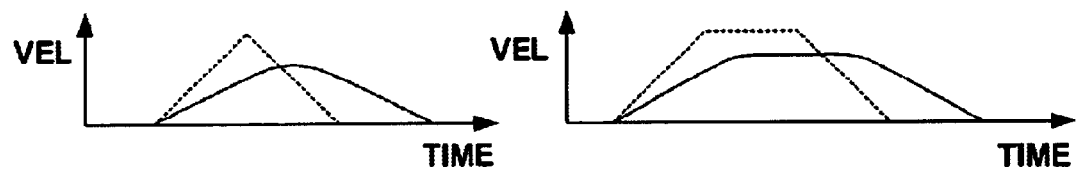
FIG. 3D shows graphs illustrating velocity seek profiles corresponding to the acceleration seek profiles of FIG. 3C.
Figure 3E:
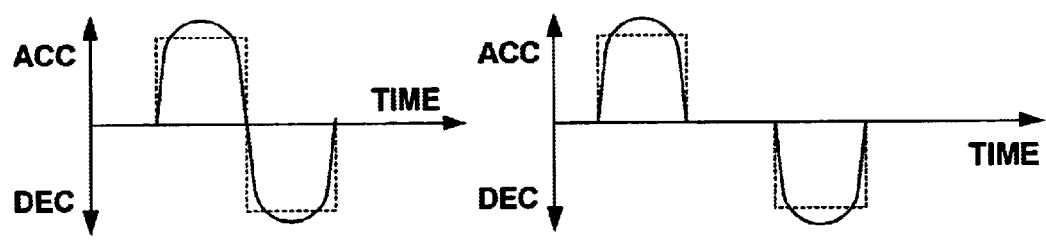
FIG. 3E shows graphs illustrating acceleration seek profiles suitable for implementing a quiet seek operating mode, according to still further embodiments of the present invention.
Figure 3F:
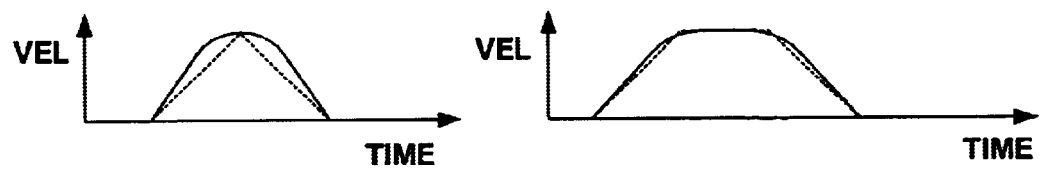
FIG. 3F shows graphs illustrating velocity seek profiles corresponding to the acceleration seek profiles of FIG. 3E.

Turning first to the graphs illustrated in FIGS. 3A and 3B, one method of reducing the audible noise attributable to seek operations within the drive 10 is to limit the magnitude of the current applied to the coil 60 of the actuator assembly 30 of FIG. 2, while stretching the period of time during which such magnitude-limited current is applied. This limits the acceleration of the actuator assembly 30 and thus limits its maximum velocity over the disks 12. A slower actuator produces less audible noise than a comparatively faster actuator. Moreover, limiting the acceleration and the velocity of the actuator also reduces the residual vibrations thereof once the actuator arrives at or near the target track on the disks 12, thereby further reducing the audible noise generated by the drive 10. Another way of reducing audible noise is to decrease the rate at which the VCM drive current is applied (its slope), as shown in FIGS. 3C and 3D. This "smoothes out" abrupt changes in the acceleration and velocity waveforms, as shown in the solid lines of FIGS. 3C and 3D. Such smoothing out may be achieved by means of an appropriate low pass filter (LPF) implemented, for example, in hardware or firmware. Such smooth acceleration and velocity profiles further decrease the acoustics of the drive 10. Differing orders of LPFs may be implemented and the cut-off frequency of such filters may be selected to define a plurality of seek profiles, each respectively corresponding to one of the aforementioned plurality of quiet seek operating modes according to the present invention. The profiles shown in FIGS. 3E and 3F may be thought of an amplified version of those shown in FIGS. 3C and 3D. Indeed, the seek profiles shown in solid lines in FIGS. 3E and 3F may be created by low pass filtering and amplifying the signal shown in dashed lines. In this manner, any seek operation carried out subject to such a seek profile may exhibit reduced acoustics, but still maintain seek times comparable to those characteristic of the higher performance seek operating mode. Alternatively still, the profiles for the quiet seek operating modes may exhibit differing smoothing or slew-rate limiting wave shaping during any or all of the acceleration, coasting and/or deceleration components of the profile. Short seeks, characterized by seeks from 1 to about 1000 tracks, for example, may utilize different profiles than for longer seeks, characterized by seeks crossing greater than about 1000 tracks, for example. Moreover, the quiet seek operating mode may be disabled during short seeks, for example, to allow the drive to quickly arrive at the target track. The profiles for both the quiet seek operating mode may be selected to be roughly sinusoidal in shape during short seek operations, for example, while slew rate limiting techniques may be favored for long seeks subject to the quiet seek operating mode or modes. Other variations may occur to those of skill in this art and all such variations should be viewed as within the scope of the present invention.

FIG. 4 illustrates another aspect of the present invention; namely a random access video recorder/player 410. As shown in FIG. 4, such a video recorder/player 410 may include a video decoder to decode the incoming video stream, labeled "Video In". Such a decoder may include, for example, a video decoder 420 for decoding a National Television Standards Committee (NTCS)-encoded video stream, a Phase Alternate Line (PAL)-encoded video stream and/or a video stream encoded according to the Systeme Electronique Couleur Avec Memoire (SECAM) protocol. Alternatively, the incoming video stream may be a three component stream formatted according to the Red Green Blue (RGB) protocol, or the YUV or YCbCr protocols, for example, where Y is the luminance component and U, Cb and V, Cr are the chrominance components of the incoming video signal. The video signal may be alternatively formatted according to some other protocol not discussed herein. An audio coder-decoder (codec) 450 is provided to decode an audio data stream input to the video recorder (labeled "Audio In") to provide a decoded audio stream Audio and video compression may be carried out at 430 according to known techniques and the compressed and decoded audio and video streams may be stored in the disk drive shown at reference 10. The disk drive 10 coupled to the audio and video compressor 430, according to the present invention, selectively provides either higher-performance seek operations or reduced-audible while effecting a seek operation. Indeed, the disk drive 10 may be structured as shown in FIG. 2 and may incorporate the functionality detailed above, the description of which is incorporated herewith by reference. An audio and video decompressor 460 may be coupled to the disk drive 10 and to the audio codec 450, the audio and video decompressor 460 decompressing the stored encoded video stream according to known techniques and sending the decompressed audio stream to the audio codec 450 to re-encode the decompressed audio stream. A video encoder 470 may be coupled to the audio and video decompressor 460, the video encoder 470 encoding the decompressed video stream to a selected display format, according to the aforementioned NTSC, PAL, SECAM, RGB, YUV or YCbCr protocols, for example. The decompressed and encoded audio and video streams may then be input to a display device, such as a television monitor or a computer display terminal, for example.

The disk drive 10 shown in FIG. 2 may be incorporated within devices other than computers and video recorder/players, however. Indeed, the enhanced acoustic behavior of the drive 10 according to the present invention lends itself to a host of other applications. For example, the drive 10 may be incorporated into still and video cameras, audio recorders, musical instruments, kitchen and home appliances or any device that may benefit from a mass storage device having selective quiet and higher performance seek operating modes.

We claim:

1. A disk drive that selectively provides either higher-performance seek operations or reduced-audible noise while effecting a seek operation, the disk drive comprising:
   a disk;
   first means for defining a higher performance seek operating mode;
   second means for defining a quiet seek operating mode, the second means including a disk drive control program and detection means for detecting a characteristic of a data stream read from or written to the disk, one of the quiet seek operating mode and the higher performance seek operating mode being invoked depending upon the detected characteristic;
   servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode.

2. The disk drive of claim 1, further comprising a host interface and wherein the second means comprises a first host command received by the host interface.

3. The disk drive of claim 2, wherein the quiet seek mode is active for executing the first host command and the disk drive reverts to the higher performance seek mode after the first host command is completed.

4. The disk drive of claim 2, wherein the disk drive remains in the quiet seek mode after executing the first host command.

5. The disk drive of claim 4, wherein the first means comprises a second host command received by the host interface.

6. The disk drive of claim 4, wherein the disk drive remains in the quiet seek mode for a selectable number of commands after executing the first host command.

7. The disk drive of claim 1, wherein the second means comprises detection means for detecting a data stream length, the quiet seek operating mode being invoked whenever the data stream length reaches a threshold length.

8. The disk drive of claim 1, wherein the second means comprises user accessible manual switch means for manually switching between the higher performance seek operating mode and the quiet seek operating mode.

9. The disk drive of claim 1, wherein the second means comprises means for measuring an ambient acoustic level, the measuring means invoking the quiet seek operating mode whenever the ambient acoustic level reaches a selectable threshold.

10. The disk drive of claim 9, wherein the measuring means includes a microphone.

11. The disk drive of claim 1, further comprising a clock means, at least one of the first and second means being responsive to a signal from the clock means to selectively switch between the higher performance seek operating mode and the quiet seek operating mode depending upon a time of day.

12. The disk drive of claim 1, wherein the second means defines a plurality of mutually different quiet seek operating modes, each of the plurality of quiet seek operating modes causing the drive to operate with mutually different levels of audible noise.

13. The disk drive of claim 12, further comprising a host interface and wherein the second means comprises a first host command received by the host interface, the first host command including an audible noise level parameter designating one of the plurality of quiet seek operating modes.

14. The disk drive of claim 12, wherein the second means comprises user accessible manual switch means configured to allow the user to manually cycle between the higher performance seek operating mode and each of the plurality of quiet seek operating modes.

15. The disk drive of claim 12, wherein the second means comprises means for measuring an ambient acoustic level and wherein the measuring means invokes a selected one of the plurality of quiet seek operating modes depending upon the measured ambient acoustic level.

16. The disk drive of claim 1, wherein a media of the disk drive is formatted into a first disk portion and a second disk portion, the first disk portion being formatted to designate the quiet seek operating mode for seek operations within the first disk portion and the second disk portion being formatted to designate the performance seek operating mode for seek operations within the second disk portion.

17. A random access video recorder/player, comprising:
   a video decoder for decoding a video stream input to the video recorder and playback to provide a decoded video stream;
   an audio codec for decoding an audio data stream input to the video recorder and playback device to provide a decoded audio stream;
   an audio and video compressor for compressing the decoded video stream and the decoded audio stream;
   a disk drive coupled to the audio and video compressor to store the compressed video stream and the decoded audio stream, the disk drive selectively providing either higher-performance seek operations or reduced-audible noise while effecting a seek operation, the disk drive comprising:
      first means for defining a higher performance seek operating mode;
      second means for defining a quiet seek operating mode;
      servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode;
   an audio and video decompression means coupled to the disk drive and to the codec means, the audio and video decompression means decompressing the stored video and audio stream and sending the decompressed audio stream to the codec means to encode the decompressed audio stream, and
   a video encoder means coupled to the audio and video decompression means, the video encoder means encoding the decompressed video stream according to a selected display format.

18. The video recorder/player of claim 17, further comprising a host interface and wherein the second means comprises a first host command received by the host interface.

19. The video recorder/player of claim 18, wherein the quiet seek mode is active for executing the first host command and the disk drive reverts to the higher performance seek mode after the first host command is completed.

20. The video recorder/player of claim 18, wherein the disk drive remains in the quiet seek mode after executing the first host command.

21. The video recorder/player of claim 20, wherein the first means comprises a second host command received by the host interface.

22. The video recorder/player of claim 20, wherein the disk drive remains in the quiet seek mode for a selectable number of commands after executing the first host command.

23. The disk drive of claim 17, wherein the second means comprises a disk drive control program.

24. The video recorder/player of claim 23, wherein the second means comprises detection means for detecting a characteristic of the data stream, one of the quiet seek operating mode and the higher performance seek operating mode being invoked depending upon the detected characteristic.

25. The video recorder/player of claim 23, wherein the second means comprises detection means for detecting a data stream length, the quiet seek operating mode being invoked whenever the data stream length reaches a threshold length.

26. The video recorder/player of claim 17, wherein the second means comprises user accessible manual switch means for manually switching between the higher performance seek operating mode and the quiet seek operating mode.

27. The video recorder/player of claim 17, wherein the second means comprises means for measuring an ambient acoustic level, the measuring means invoking the quiet seek operating mode whenever the ambient acoustic level reaches a selectable threshold.

28. The disk drive of claim 27, wherein the measuring means includes a microphone.

29. The video recorder/player of claim 17, further comprising a clock means, at least one of the first and second means being responsive to a signal from the clock means to selectively switch between the higher performance seek operating mode and the quiet seek operating mode depending upon a time of day.

30. The video recorder/player of claim 17, wherein the second means defines a plurality of mutually different quiet seek operating modes, each of the plurality of quiet seek operating modes causing the drive to operate with mutually different levels of audible noise.

31. The video recorder/player of claim 30, further comprising a host interface and wherein the second means comprises a first host command received by the host interface, the first host command including an audible noise level parameter designating one of the plurality of quiet seek operating modes.

32. The video recorder/player of claim 30, wherein second means comprises user accessible manual switch means configured to allow the user to manually cycle between the higher performance seek operating mode and each of the plurality of quiet seek operating modes.

33. The video recorder/player of claim 30, wherein the second means comprises means for measuring an ambient acoustic level and wherein the measuring means invokes a selected one of the plurality of quiet seek operating modes depending upon the measured ambient acoustic level.

34. The video recorder/player of claim 17, further comprising a modem, the quiet seek mode being selectively active at least a portion of a time when the modem is downloading or uploading information.

35. A disk drive that selectively provides either higher-performance seek operations or reduced-audible noise while effecting a seek operation, the disk drive comprising:
    first means for defining a higher performance seek operating mode;
        second means for defining a quiet seek operating mode, the second means including a disk drive control program and detection means for detecting a data stream length, the quiet seek operating mode being invoked whenever the data stream length reaches a threshold length;
    servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode.

36. The disk drive of claim 35, wherein a media of the disk drive is formatted into a first disk portion and a second disk portion, the fist disk portion being formatted to designate the quiet seek operating mode for seek operations within the first disk portion and the second disk portion being formatted to designate the performance seek operating mode for seek operations within the second disk portion.

37. A disk drive that selectively provides either higher-performance seek operations or reduced-audible noise while effecting a seek operation, the disk drive comprising:
    first means for defining a higher performance seek operating mode;
    second means for defining a quiet seek operating mode, the second means comprising means for measuring an ambient acoustic level, the measuring means invoking the quiet seek operating mode whenever the ambient acoustic level reaches a selectable threshold;
    servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode.

38. The disk drive of claim 37, wherein the measuring means includes a microphone.

39. The disk drive of claim 37, wherein the second means comprises means for measuring an ambient acoustic level and wherein the measuring means invokes a selected one of a plurality of quiet seek operating modes depending upon the measured ambient acoustic level.

40. The disk drive of claim 37, wherein a media of the disk drive is formatted into a first disk portion and a second disk portion, the first disk portion being formatted to designate the quiet seek operating mode for seek operations within the first disk portion and the second disk portion being formatted to designate the performance seek operating mode for seek operations within the second disk portion.

41. A disk drive that selectively provides either higher-performance seek operations or reduced-audible noise while effecting a seek operation, the disk drive comprising:

first means for defining a higher performance seek operating mode;

second means for defining a quiet seek operating mode;

servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode, and time keeping means, at least one of the first and second means being responsive to a signal from the time keeping means to selectively switch between the higher performance seek operating mode and the quiet seek operating mode depending upon a time of day.

42. The disk drive of claim 41, wherein a media of the disk drive is formatted into a first disk portion and a second disk portion, the first disk portion being formatted to designate the quiet seek operating mode for seek operations within the first disk portion and the second disk portion being formatted to designate the performance seek operating mode for seek operations within the second disk portion.

43. A disk drive that selectively provides either higher-performance seek operations or reduced-audible noise while effecting a seek operation, the disk drive comprising:

first means for defining a higher performance seek operating mode;

second means for defining a quiet seek operating mode, the second means defining a plurality of mutually different quiet seek operating modes, each of the plurality of quiet seek operating modes causing the drive to operate with mutually different levels of audible noise, the second means comprising means for measuring an ambient acoustic level, the measuring means invoking a selected one of the plurality of quiet seek operating modes depending upon the measured ambient acoustic level;

servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode.

44. The disk drive of claim 43, wherein the measuring means includes a microphone.

45. The disk drive of claim 43, wherein a media of the disk drive is formatted into a first disk portion and a second disk portion, the first disk portion being formatted to designate the quiet seek operating mode for seek operations within the first disk portion and the second disk portion being formatted to designate the performance seek operating mode for seek operations within the second disk portion.

46. A disk drive that selectively provides either higher-performance seek operations or reduced-audible noise while effecting a seek operation, the disk drive comprising:

first means for defining a higher performance seek operating mode;

second means for defining a quiet seek operating mode;

servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode, and media, the media being formatted into a first disk portion and a second disk portion, the first disk portion being formatted to designate the quiet seek operating mode for seek operations within the first disk portion and the second disk portion being formatted to designate the performance seek operating mode for seek operations.

47. A disk drive that selectively provides either higher-performance seek operations or reduced-audible noise while effecting a seek operation, the disk drive comprising:

first means for defining a higher performance seek operating mode;

second means for defining a quiet seek operating mode;

servo means for controlling seek operations, the servo means including means for defining a plurality of seek profiles including a first seek profile defined to provide relatively short average seek times and a second seek profile defined to provide quieter operation on average in comparison with the first seek profile, and means for effecting a seek subject to the first seek profile in response to the higher performance seek operating mode and for effecting a seek subject to the second seek profile in response to the quiet seek operating mode, and a host interface, the second means comprising a first host command received by the host interface, the quiet seek mode being active for executing the first host command, and the disk drive autonomously reverting to the higher performance seek mode after the first host command is completed.

* * * * *